(12) United States Patent
Duke et al.

(10) Patent No.: US 12,608,505 B2
(45) Date of Patent: Apr. 21, 2026

(54) CENTRAL AND EDGE PROCESSING NODE IDENTIFICATION

(71) Applicant: Accenture Global Solutions Limited, Dublin (IE)

(72) Inventors: Brian Michael Duke, Milton, GA (US); Surya Raghavendra Vadlamani, Newtown, PA (US); Sanju Ganeshprasad Dabi, Farmers Branch, TX (US); Jagaran Das, Durgapur (IN); Bogdan Petru Bistriceanu, Chicago, IL (US); Peter Royer Smith, Jr., Sharon, CT (US)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 368 days.

(21) Appl. No.: 18/214,047

(22) Filed: Jun. 26, 2023

(65) Prior Publication Data

US 2025/0284845 A1     Sep. 11, 2025

(51) Int. Cl.
*G06F 21/62*          (2013.01)

(52) U.S. Cl.
CPC ................................ *G06F 21/6254* (2013.01)

(58) Field of Classification Search
CPC .................................................. G06F 21/6254
See application file for complete search history.

(56) References Cited

U.S. PATENT DOCUMENTS

| | | | | |
|---|---|---|---|---|
| 10,193,696 B2 | 1/2019 | Struttmann et al. | | |
| 10,348,603 B1 * | 7/2019 | Singh | .................. | H04L 45/7453 |
| 10,505,740 B2 | 12/2019 | Struttmann et al. | | |
| 11,190,589 B1 | 11/2021 | Ron et al. | | |
| 12,309,236 B1 * | 5/2025 | Frazier, Jr. | .......... | G06F 16/9535 |
| 2002/0133607 A1 * | 9/2002 | Nikander | ............ | H04L 63/0442 709/229 |
| 2011/0055221 A1 * | 3/2011 | Sovio | .................. | G06F 16/9024 707/747 |

(Continued)

FOREIGN PATENT DOCUMENTS

WO          2020100118 A1     5/2020

OTHER PUBLICATIONS

Extended European Search Report for EP Application No. 24184801. 9, dated Nov. 12, 2024, 11 pages.

*Primary Examiner* — Stephen T Gundry
(74) *Attorney, Agent, or Firm* — Mannava & Kang, P.C.

(57) ABSTRACT

Methods, systems, and apparatus, including computer programs encoded on computer-storage media, for enriching or exchanging identifying information using central and edge processing nodes. In some implementations, a method includes generating a hash value for each of one or more components of identifying information of a first entity; discarding the identifying information; storing the hash value for each of the one or more components of the identifying information and not the identifying information; generating a network graph linking the hash value for each of the one or more components of the identifying information with the first entity; providing the hash of the identifying information to a central server; and updating, using response data from the central server, the network graph to additionally link to a respective hash value for each component in a second set of components identifying the first entity.

20 Claims, 5 Drawing Sheets

(56)          References Cited

U.S. PATENT DOCUMENTS

| | | | |
|---|---|---|---|
| 2014/0201007 A1 | 7/2014 | Stack et al. | |
| 2018/0367518 A1* | 12/2018 | Singh | H04L 63/06 |
| 2020/0050795 A1* | 2/2020 | Solomon | G06F 16/2255 |
| 2020/0267225 A1* | 8/2020 | Wang | H04L 67/145 |
| 2020/0344062 A1* | 10/2020 | Haldar | G06F 21/604 |
| 2020/0349277 A1 | 11/2020 | Torbey | |
| 2021/0110108 A1* | 4/2021 | Maguire | G06F 16/93 |
| 2023/0140020 A1 | 5/2023 | Parameswar | |
| 2023/0267371 A1* | 8/2023 | Park | G06F 21/6254 |
| | | | 706/12 |
| 2024/0121211 A1* | 4/2024 | Bhatia | H04L 63/0272 |

* cited by examiner

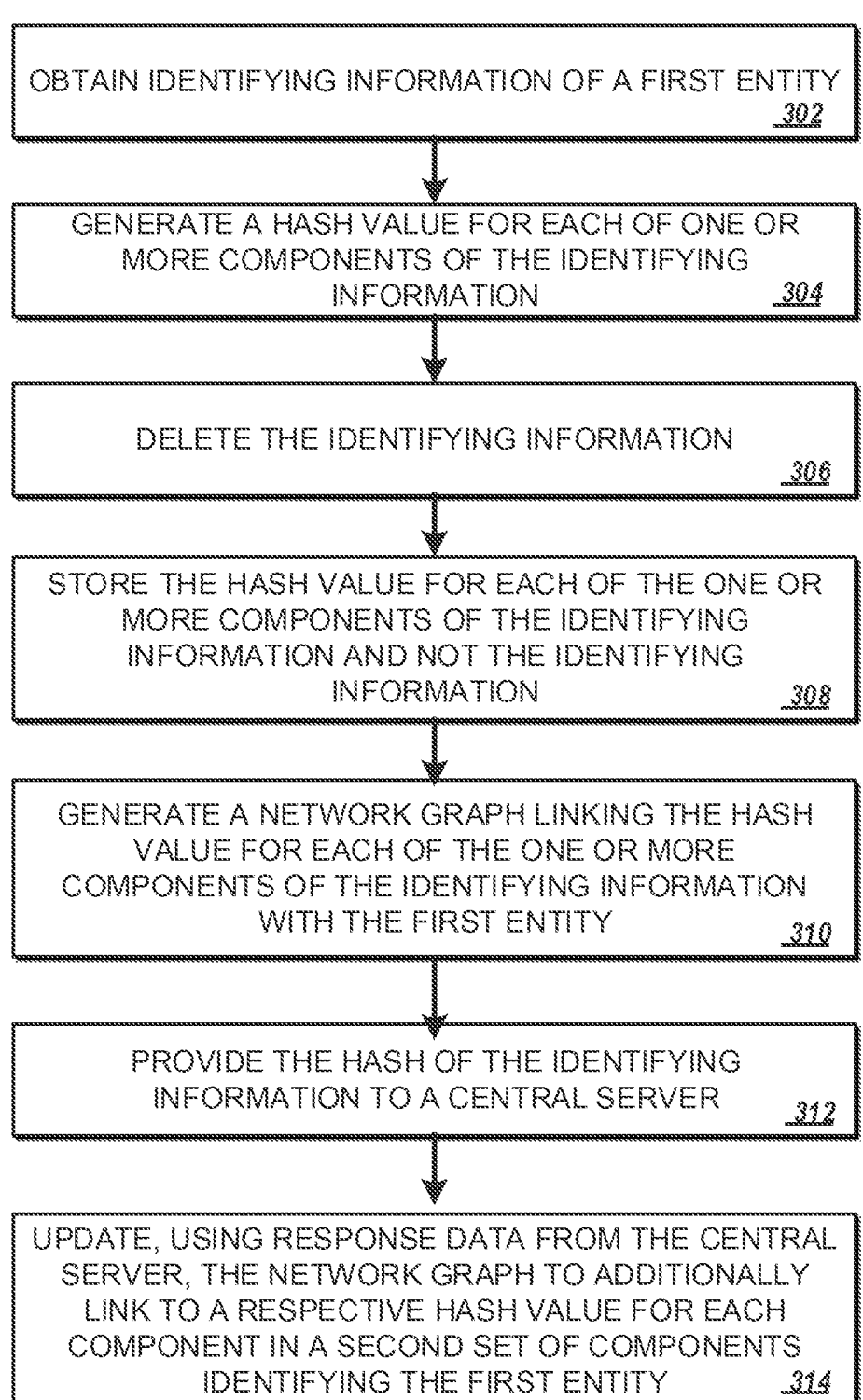

OBTAIN IDENTIFYING INFORMATION OF A FIRST ENTITY _302_

GENERATE A HASH VALUE FOR EACH OF ONE OR MORE COMPONENTS OF THE IDENTIFYING INFORMATION _304_

DELETE THE IDENTIFYING INFORMATION _306_

STORE THE HASH VALUE FOR EACH OF THE ONE OR MORE COMPONENTS OF THE IDENTIFYING INFORMATION AND NOT THE IDENTIFYING INFORMATION _308_

GENERATE A NETWORK GRAPH LINKING THE HASH VALUE FOR EACH OF THE ONE OR MORE COMPONENTS OF THE IDENTIFYING INFORMATION WITH THE FIRST ENTITY _310_

PROVIDE THE HASH OF THE IDENTIFYING INFORMATION TO A CENTRAL SERVER _312_

UPDATE, USING RESPONSE DATA FROM THE CENTRAL SERVER, THE NETWORK GRAPH TO ADDITIONALLY LINK TO A RESPECTIVE HASH VALUE FOR EACH COMPONENT IN A SECOND SET OF COMPONENTS IDENTIFYING THE FIRST ENTITY _314_

FIG. 3

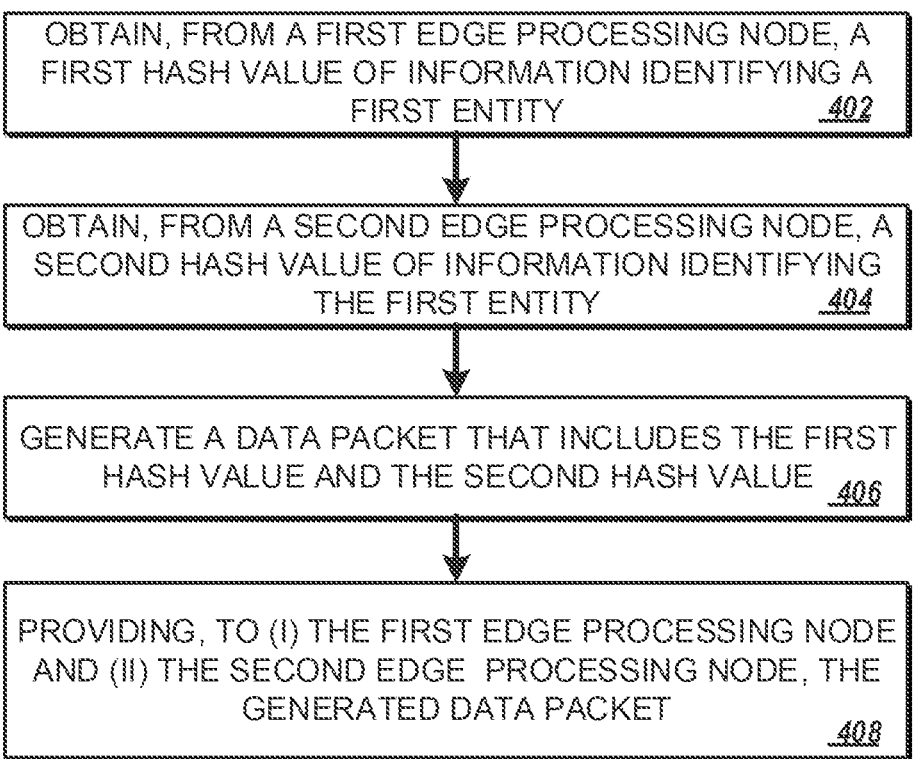

OBTAIN, FROM A FIRST EDGE PROCESSING NODE, A FIRST HASH VALUE OF INFORMATION IDENTIFYING A FIRST ENTITY        _402_

OBTAIN, FROM A SECOND EDGE PROCESSING NODE, A SECOND HASH VALUE OF INFORMATION IDENTIFYING THE FIRST ENTITY        _404_

GENERATE A DATA PACKET THAT INCLUDES THE FIRST HASH VALUE AND THE SECOND HASH VALUE        _406_

PROVIDING, TO (I) THE FIRST EDGE PROCESSING NODE AND (II) THE SECOND EDGE PROCESSING NODE, THE GENERATED DATA PACKET        _408_

FIG. 4

CENTRAL AND EDGE PROCESSING NODE IDENTIFICATION

TECHNICAL FIELD

This specification generally relates to centralized and edge processing of personally identifying information.

BACKGROUND

Personally identifying information can be provided through various sites and applications over the Internet and in offline interactions.

SUMMARY

In some implementations, techniques described in this document include obtaining, via an interface operating on a device of a user, identifying information of a first entity; generating a hash value for each of one or more components of the identifying information; discarding the identifying information; storing the hash value for each of the one or more components of the identifying information and not the identifying information; generating a network graph linking the hash value for each of the one or more components of the identifying information with the first entity; providing the hash of the identifying information to a central server; and updating, using response data from the central server, the network graph to additionally link to a respective hash value for each component in a second set of components identifying the first entity.

Other implementations of this and other aspects include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue of having instructions that, when executed by data processing apparatus, cause the apparatus to perform the actions.

The foregoing and other embodiments can each optionally include one or more of the following features, alone or in combination. For instance, in some implementations, updating, using the response data from the central server, the network graph to additionally link to a respective hash value for each component in the second set of components identifying the first entity comprises: obtaining the response data from the central server representing one or more hash values of the second set of components identifying the first entity.

In some implementations, generating the network graph comprises: generating a network graph linking the hash value for each of the one or more components of the identifying information with additional hash values representing information identifying the first entity.

In some implementations, the information identifying the first entity includes a name of a person. In some implementations, actions include obtaining the additional hash values representing information identifying the first entity from a digital advertising system.

In some implementations, providing the hash of the identifying information to the central server comprises: providing at least a portion of the network graph to the central server.

In some implementations, discarding the identifying information includes discarding a plaintext representation of the identifying information. In some implementations, actions include storing the identifying information in cache memory; and generating, using the identifying information stored in cache memory, the hash value for each of the one or more components of the identifying information.

Another innovative aspect of the subject matter described in this specification is embodied in a method for combining anonymized data on a network that includes obtaining, from a first edge processing node, a first hash value of information identifying a first entity; obtaining, from a second edge processing node, a second hash value of information identifying the first entity; generating a data packet that includes the first hash value and the second hash value; and providing, to (i) the first edge processing node and (ii) the second edge processing node, the generated data packet.

Other implementations of this and other aspects include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue of having instructions that, when executed by data processing apparatus, cause the apparatus to perform the actions.

The foregoing and other embodiments can each optionally include one or more of the following features, alone or in combination. For instance, in some implementations, generating the data packet that includes the first hash value and the second hash value comprises: storing in temporary storage the first hash value and the second hash value without decrypting the first hash value and the second hash value.

In some implementations, actions include providing an interface to the first edge processing node and the second edge processing node. In some implementations, obtaining, from the first edge processing node, the first hash value of information identifying the first entity and obtaining, from the second edge processing node, the second hash value of information identifying the first entity comprises: obtaining, from the interface operating on the first edge processing node, the first hash value of information identifying the first entity; obtaining, from the interface operating on the second edge processing node, the second hash value of information identifying the first entity.

In some implementations, obtaining the hash value of information identifying the first entity from the edge processing node comprises: obtaining a hash value of a name of a person, wherein the first entity is a person. In some implementations, one or more of the first edge processing node and the second edge processing node are operated by a digital advertising system.

Advantageous implementations can include one or more of the following features. For example, edge processing nodes operating on user computing devices can alleviate processing requirements at a central server for processing identification connections for one or more entities. Edge processing nodes can similarly anonymize input data, by immediate hashing and discarding plain text input, to prevent centralized access to personally sensitive information. Any data storage or aggregation can occur in encrypted or hashed form, thus achieving data security and privacy preservation for data including highly sensitive or personalized data, such as address information, name, social security number, among others.

In some implementations, identity information processing is performed at edge processing nodes. For example, edge processing nodes can obtain identifying information of an entity and combine the information with one or more simultaneously obtained or previously obtained components of identifying information. In some implementations, participants in a system processing information on edge processing nodes do not lose control of their valuable customer data. In some implementations, edge processing nodes alleviate central server processing requirements—e.g., servers are not overloaded with data processing or query requests, potentially eliminating down time or reducing central server infrastructure requirements. In addition, personalized use of services, such as websites or applications, can benefit from determining a new user interaction is actually a preexisting user such that previous preferences, workflows, or other optimizations of the user can be used in the new user interaction. In addition, similar digital content can be presented to the user.

In some implementations, techniques described in this document enable identifying information to be synchronized across a network of identity graphs. Information can be synchronized in real or near real time (e.g., within seconds). Information can be synchronized with a high degree of granularity, such as synchronization by updating individual user records instead of batches of user records.

The details of one or more embodiments of the invention are set forth in the accompanying drawings and the description below. Other features and advantages of the invention will become apparent from the description, the drawings, and the claims.

BRIEF DESCRIPTION OF THE DRAWINGS

FIG. 3 is a flow diagram illustrating an example of a process for enriching identifying information using central and edge processing nodes.

FIG. 4 is a flow diagram illustrating an example of a process for enriching identifying information using central and edge processing nodes.

Like reference numbers and designations in the various drawings indicate like elements.

DETAILED DESCRIPTION

In some implementations, techniques described allow for generating a unique, stable, consistent, and/or high confidence master digital identifier for multiple entities. Entities can include users of one or more internet of things (IoT) devices. Network of brands, publishers, or digital content provisioning systems, among others, can use these digital identifiers to improve user experiences, such as personalization, application optimization, automated actions, among others.

In some implementations, techniques described include edge processing separate from centralized processing. For example, an edge processing node can process identifying information such that participating (i) entities operating one or more nodes do not lose control of their user data and (ii) central processing nodes are not overloaded with data processing or query requests.

In some implementations, systems described with edge and central processing nodes can synchronize one or more networks of identify graphs. For example, an identity graph can include one or more items of information (e.g., name, address, email, phone number, among others) that identify an entity. The edge and central processing nodes described herein can synchronize identifying information corresponding to an entity through batch updates to one or more entities or individual user records corresponding to one or more users. Synchronization can occur as updated data is obtained by an element of the system or periodically. In some implementations, data is updated according to type. For example, data types likely to change more quickly (e.g., email address or phone number) are updated more rapidly compared to data types less likely to change more quickly (e.g., home address).

In some implementations, identifying information is aggregated at multiple levels. For example, a user of a system of edge and central processing nodes can create a unifying identifier for a first party touchpoint; a unifying identifier that combines consumer identities across all brands in a group of brands managed by an enterprise; a unifying identifier across all entities within a network of entities. In some implementations, multiple identity networks coexist. The multiple identity networks can be logically separated from each other. Users can belong to multiple identity networks simultaneously.

Figure 1:
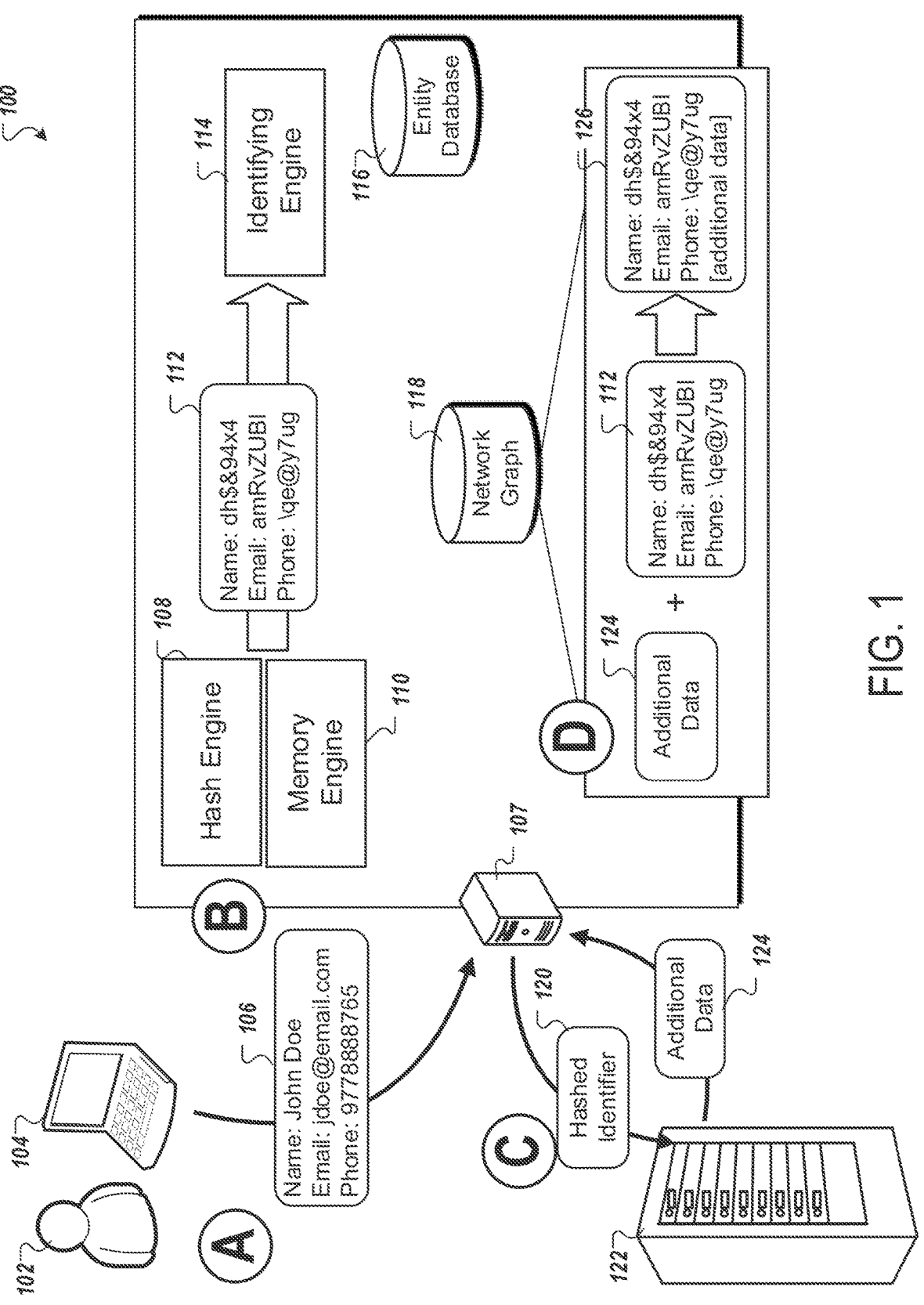
FIG. 1 is a diagram showing an example of a system for enriching identifying information using central and edge processing nodes.

FIG. 1 is a diagram showing an example of a system 100 for enriching identifying information using central and edge processing nodes. The system 100 includes a user device 104, an edge processing node 107, and a central processing node 122. In this example, the user device 104 is a laptop computer, the edge processing node 107 is a computing device operating in a vicinity (e.g., within a threshold distance) of the user device 104, and the central processing node 122 is at least one computing device operating remote from the edge processing node 107 and the user device 104. The user device 104, the edge processing node 107, and the central processing node 122 are communicably connected by a wired or wireless data connection that allows for exchanging information between them.

Generally, the system 100 illustrates identifying data obtained from the user device 104 being used to generate a unified identity element in an identity graph stored by the edge processing node 107. The edge processing node 107 can then use the unified identity to query for additional data obtained from the central processing node 122. The additional data, e.g., additional data 124, can include identifying information of the entity described by information 106, e.g., John Doe. Identifying information can include one or more of, e.g., name, email, phone, address, digital content identifiers, web cookies, device identifiers, GPS data, among others.

In stage A, the user device 104 provides identifying information to the edge processing node 107. For example, the user device 104 can be used to navigate on a webpage or within an application. A user 102 of the user device 104 can input identifying information of an entity—e.g., of the user 102 themselves or another entity which can include non-person entities, such as businesses or the like. Identifying information 106 provided by the user device 104 can be obtained by the edge processing node 107.

In this example, the identifying information includes a name, email, and phone number. In general, the identifying information can include any data that identifies an entity. Other data items can include home address, related contacts, physical characteristics, among others.

In stage B, the edge processing node 107 processes the information 106. The edge processing node 107 can operate one or more processing engines that can be realized in one or more hardware computing elements (e.g., elements described in reference to FIG. 5). The engines can perform processing tasks on the information 106. For example, the edge processing node 107 can operate one or more hardware components configured to perform operations (e.g., execute programming instructions that result in performance of operations) corresponding to a hash engine 108, a memory engine 110, and an identifying engine 114.

In some implementations, the edge processing node 107 is a portion of the hardware of the user device 104 selected for processing information. For example, the user device 104 can includes readable memory with instructions that, when executed, perform operations of the edge processing node 107. In some implementations, the user device 104 communicates directly with the central processing node 122. For example, the user device 104 can implement operations described in reference to the edge processing node 107 including sending encrypted data to the central processing node 122. In some implementations, an intermediary, separate, edge processing node is used, e.g., to help ensure confidentiality and/or to increase uniformity of applied processing stages and communication with the central processing node 122. In some implementations, the user device 104 never communicates directly with the central processing node 122. For example, the user device 104 can communicate with the edge processing node 107 but not the central processing node 122 and the edge processing node 107 can communicate with the central processing node 122.

The hash engine 108 processes the information 106 to generate an obfuscated version of the information 106. In some implementations, the obfuscated version of the information 106 can be generated using one or more hash algorithms operated by the hash engine 108—e.g., SHA-256. In some implementations, the hash engine 108 can generate one or more tokens using the parameters provided in the information 106. In some implementations, the hash engine 108 tokenizes each data item included in the information 106, e.g., to help ensure privacy of the entity information. A token generated by the hash engine 108 can include a hash value generated from a hash algorithm (e.g., SHA256, SHA512, among others). These hash values can help ensure privacy by obfuscating user information which can include sensitive information such as name, address, financial information, among others.

The hash engine 108 generates encrypted data 112 based on processing the information 106. The encrypted data 112 can be an example of obfuscated information. The memory engine 110 discards the plaintext version of the information 106, e.g., after the encrypted data 112 is generated from the information 106. In some implementations, the memory engine 110 discards the plaintext version of information 106 before the edge processing node 107 stores the information 106 to non-temporary storage. For example, the information 106 can be stored in cache to perform encryption before being immediately discarded after the encrypted data 112 is generated.

In some implementations, the hash engine 108 generates a consistent hash. For example, for the same input data, the hash engine 108 generates the same output data. In this way, the edge processing node 107 can update, add, or combine information related to a given entity, based on an encrypted version of identifying information of the entity, without storing, exposing, or distributing the actual identifying information of the entity.

The edge processing node 107 provides the encrypted data 112 to the identifying engine 114. The identifying engine 114 can use elements of the encrypted data 112 to determine whether or not the entity identified by the encrypted data 112 is stored in a network graph 118 stored by the edge processing node 107. In some implementations, the identifying engine 114 uses an entity database 116 to query entities. For example, the identifying engine 114 can generate a query using data from the encrypted data 112. The query can obtain corresponding entity information stored in the entity database 116 if the given entity was previously identified or a null or other indicative result if the entity was not previously identified or no corresponding information is stored by the edge processing node 107 corresponding to the given identity.

In some implementations, both the query and the database include encrypted forms of information. For example, the identifying engine 114 can generate a query for an email address of a user. The identifying engine 114 can generate a query that includes an encrypted form of identifying information of the user (e.g., a legal name, home address, device identifier, among others). The entity database 116 can include information in encrypted form including one or more data items corresponding to user identifiers. The entity database 116 can compare the encrypted identifier provided in the query generated by the identifying engine 114 to one or more stored encrypted identifiers associated with additional data, such as email addresses. In response to the entity database 116, or computer communicably connected to the entity database 116, determining that the encrypted identifier of the query (e.g., data of the encrypted data 112) matches a stored encrypted identifier, the entity database 116 can provide data associated with the matched identifier to the identifying engine 114. The identifying engine 114 can obtain associated data, such as an email address, associated with the same encrypted identifier provided in a query.

In some implementations, the entity database 116 includes readable forms of data types for one or more entity entries. For example, a data type can be stored in encrypted form such that the general category of information is not known. In order to facilitate queries for specific data, the entity database 116 can include readable forms of data types (e.g., email address, home address, among others) indicating what a given encrypted form of data represents. Elements, such as the identifying engine 114 can then request specific information by including, in a query, encrypted or hashed identifying information and an indicating of a data type to be obtained (e.g., email address, phone number, name, among others). In some implementations, a query obtains all known data associated with the entity without specifying specific types of data to be obtained.

In some implementations, the network graph 118 includes data corresponding to the entity database 116. For example, the network graph 118 can store connections between entities and corresponding identifying information (e.g., encrypted forms of identifying information), which are stored in the entity database 116. Alternatively, in some implementations, the network graph 118 and the entity database 116 can be consolidated into a single data storage device that stores information about entities as well as connections between various entities and their respective identifying information (e.g., encrypted forms of identifying information).

In stage C, the edge processing node 107 sends a hashed identifier 120 to the central processing node 122. The edge processing node 107 can send the hashed identifier 120 using one or more communication networks communicably connecting the edge processing node 107 and the central processing node 122. In some implementations, the hashed identifier 120 is a hash value generated from a set of individually encrypted data. In some implementations, the hashed identifier 120 is an encrypted form of one or more sets of individually encrypted data items.

In some implementations, the hashed identifier 120 includes an element (e.g., one or more of: Name: dh$&94x4, Email: amRvZUBI, or Phone: \qe@y7ug, among others) of the encrypted data 112. For example, without exposing sensitive information, the edge processing node 107 can obtain additional information for the entity identified by the encrypted data 112. In some implementations, the additional information, e.g., the additional data 124 which can be an encrypted form of information similar to the encrypted data 112, is used to personalize an experience, optimize functionality, or serve content to a user experience being provided by the user device 104. For example, actions by a user using a first email or a first device can be used to personalize an experience, optimize functionality, or serve content to the user same user when they use a second email or second device using a connection between the first email or first device and the second email or second device each associated with an identifier of the user. All data of the user (e.g., John Doe in the example of FIG. 1) can be stored in encrypted form, e.g., in the network graph 118.

In some implementations, the central processing node 122 queries one or more databases to determine one or more additional items of data to provide to the edge processing node 107 in response to the request from the edge processing node 107 that includes the hashed identifier 120. For example, the central processing node 122 can query an identity graph stored by the central processing node 122. In some implementations, the central processing node 122 compares one or more identifiers in an identity graph to the hashed identifier 120. For example, the central processing node 122 can compare a first identifier to the hashed identifier 120. In response to determining the first identifier matches the hashed identifier 120, the central processing node 122 can provide additional data (e.g., encrypted name, encrypted email, or other information) to the edge processing node 107. In response to determining the first identifier does not match the hashed identifier 120, the central processing node 122 can compare the hashed identifier 120 to one or more other identifiers to determine one or more matches.

In stage D, the edge processing node 107 combines the additional data 124, obtained from the central processing node 122 in response to providing the hashed identifier 120, with the encrypted data 112 to generate the enriched data 126. The enriched data 126 includes additional identifying information compared to the encrypted data 112. Similar to the encrypted data 112, the additional data 124 added from the central processing node 122 can be encrypted in a non-plain text readable form (e.g., using a same hash algorithm as that operated by the hash engine 108). The network graph 118 can be operated by the edge processing node 107 and store the enriched data 126. The enriched data 126 can include one or more additional elements included in the additional data 124 (e.g., encrypted Medicare identification, alternate email, among others). The edge processing node 107 can use the enriched data 126 to adjust an experience of an interface provided by the user device 104 (e.g., fetching digital content based on one or more of the additional data elements of the additional data 124).

In some implementations, the edge processing node 107 provides one or more elements of the enriched data 126 to one or more connected components. For example, the edge processing node 107 can provide one or more elements of the enriched data 126 to one or more other edge processing nodes upon request from the other edge processing nodes or upon generating the enriched data 126.

Querying For Unidentified Entities

In some implementations, the identifying engine 114 may not be able establish or determine an identity for a given entity. For example, the identifying engine 114 may query the entity database 116 using one or more elements of the encrypted data 112 and determine, based on querying the entity database 116, that the entity identified by the encrypted data 112 is not stored by the edge processing node 107 (e.g., based on not finding a corresponding match for the one or more elements of the encrypted data 112).

In response to determining the entity identified by the encrypted data 112 is not stored by the edge processing node 107, or otherwise determining that an identity cannot be established, the edge processing node 107 can query the central processing node 122. The edge processing node 107 can generate a query configured to obtain an identity corresponding to an element of the encrypted data 112. The generated query can include one or more elements of the encrypted data 112. The central processing node 122 can obtain the query data and query its corresponding databases or network identify graphs to determine if identifying information exists for the corresponding encrypted data element. In some implementations, plaintext identifiers are never used and encrypted forms of identifying information are used exclusively for querying and determining a unified identity for one or more entities.

In response to the query and identifying one or more identifying information for the entity, the central processing node 122 can provide such information to the edge processing node 107. In some implementations, the process of querying for unidentified entities is used to resolve unknown user interactions (e.g., a user using a different email address on a website) to a known customer identifier (e.g., determining the user has encrypted data already stored using a common encrypted identifier or the encrypted different email address). For example, an encrypted string of text that is an encrypted form of a person's name can be used as an identifier. However, the edge processing node 107 may obtain data of an email address of the person (e.g., through an interaction of the user with a website where the user entered the email address in an input prompt).

The edge processing node 107 may not be provided or have stored the corresponding encrypted form of the person's name. The edge processing node 107 can generate the hashed identifier 120 including an encrypted form of the email address in response to determining no entity associated with the email address exists in the network graph 118. In response to obtaining the hashed identifier 120 transmitted by the edge processing node 107, the central processing node 122 can provide additional data (e.g., the additional data 124) associated with the encrypted form of the email address. For example, if the central processing node 122 has previously associated an encrypted form of the different email address and the person's name, the central processing node 122 can provide the encrypted form of the person's name so that the edge processing node 107 can update its identity network graph.

In some implementations, querying occurs in response to an interface activation by a user. For example, an interface can be configured on a website, mobile website, or application. A website or mobile website can run on a browser of the user device 104 and be hosted, at least in part, by the edge processing node 107. On a website or mobile website, on page load, JavaScript, or other embedded programming language, can be used to query the central processing node 122 if a corresponding edge processing node 107 cannot establish an identity for a user interacting with a corresponding website based on one or more identifying elements provided by the user (e.g., IP address, location, email, among others). In some implementations, the central processing node 122 returns entity identifiers (e.g., when data corresponding to the entity is stored by the central processing node 122), audience or segmentation assignments, a next best action, among others.

In some implementations, a next best action includes recommendations provided to an end user. For example, recommendations can include a recommendation on what the end user can do. If a mobile device of a customer is an older model that does not support 5G, the central processing node 208 or the edge processing node 107 can determine a next best action that includes a prompt indicating the end user to upgrade to latest a device that supports 5G connectivity.

In some implementations, an interface is configured on an application, e.g., running on the user device 104 hosted or managed, at least in part, by the edge processing node 107. In one example case, upon opening the app, a software development kit can load. During application usage, if the edge processing node 107 cannot determine an identity for a given user, the software development kit can be configured to query the central processing node 122 where, as mentioned, the central processing node 122 can return entity identifiers (e.g., when data corresponding to the entity is stored by the central processing node 122), audience or segmentation assignments, a next best action, among others. The software development kit can be configured to query the edge processing node 107 (e.g., using the identifying engine 114 described herein) to determine whether the edge processing node 107 can establish an identity for a given entity.

In some implementations, a query sent to the central processing node 122 includes identifying information for a particular user along with types of additional identifying information requested. Additional information requested can include data required to provide a personalized experience or fetch personalized digital content for a user engaging in either a website or application. Additional information can include identifiers 'adobe_id' and 'tradedesk_id.'

In one example case, a user may have switched devices or browsers and performs a login action. An edge processing node 107 can determine one or more encrypted identifiers (e.g., encrypted data 112) using the obtained login information (e.g., similar to the information 106). The edge processing node 107 can request additional data to help provide personalization, optimization, or digital content serving. The additional data can include e.g., martech identifiers for Adobe Experience Platform and TradeDesk.

One example query, e.g., for additional entity data, could be represented using the following code:

```
curl -X POST https://some-idr-endpoint.com/idgraph
  -H 'Content-Type: application/json'
  -d '{"request_type":"single",
```

-continued

```
"cust_id":"crm1",
"requesting":[adobe_id, tradedesk_id]
}'
```

One example response, e.g., including additional data, could include:

```
{
  "person_ids": {
    "cust_id": ["crm1"]
  },
  "martech_ids": {
    "adobe_id": ["adobe123","adobeXYZ"],
    "tradedesk_id":["tradeDesk123"]
  }
}
```

The response can be obtained by the edge processing node 107 from the central processing node 122. The response can include a JSON formatted object containing requested martech partner identifiers. These identifiers can be processed by an interface hosted or managed by the edge processing node 107 (e.g., a website or application) into AEP or TradeDesk for personalization, experience optimization, or digital content serving.

In general, one or more inputs can include data indicating: an entity identifying information (e.g., string), one or more cookies associated with an entity (e.g., cookie IDs formatted as an array of strings, one or more device identifiers (e.g., MAC, IMEI, among others formatted as an array of strings, or one or more application identifiers (e.g., formatted as an array of strings).

In general, one or more outputs can include data indicating: an entity identifier, one or more application identifiers, a decision or next best action, segment or audience assignment e.g., for digital content providing, among others.

In some implementations, querying for unidentified entities is a lightweight program (e.g., less than 10 ms response time). Requests can be handled by the central processing node 122, which can be centralized in location or included in a group of multiple central processing nodes and used for edge processing nodes within a vicinity of the central processing node 122. In using a nearby central processing node, e.g., the central processing node 122 within a threshold distance determined by the edge processing node 107, the edge processing node 107 can reduce response time in providing personalized content or optimization for a user of a system or interface managed or hosted by the edge processing node 107. In some implementations, content delivery networks (CDNs) are used by the edge processing node 107 to help reduce round trip response time.

Batch Requests

In some implementations, the system 100 enables batch requests and updating of records. The system 100 can enable enriching a list of known entities with attributes present in the system 100 (e.g., stored on the edge processing node 107, central processing node 122, or other node not shown). Similar to the additional data 124 described as obtained from the central processing node 122, additional data from a batch request of two or more entities can be used for one or more automated actions, such as experience personalization, decisions, recommendations, content serving, among others.

Similar to the communication described in reference to FIG. 1, the edge processing node 107 can provide data to the central processing node 122 in a request for additional data.

The central processing node 122 can provide the additional data in response to the request or an indication that such data is not available. Such data can be updated for a single entity (as shown in FIG. 1) or multiple entities, such as a batch request for updates to multiple entities. Single or bulk updating requests can be performed automatically or by manual user request or upon request by an edge processing node with respect to entities stored in that node's identity graph. For example, updating requests can be sent by the edge processing node 107 in response to obtaining data of an entity for which it cannot establish an identity. Updating requests can be sent periodically (e.g., every 10 minutes, 1 second, or other time increment).

For providing digital content, the edge processing node 107 can obtain identifiers for specific digital content for one or more entities from the central processing node 122. Identifiers can include identifying information for digital content providing, such as advertising or other personalization of an experience, e.g., on the user device 104. The central processing node 122 can provide data indicating entity identifying information, audience or segmentation assignments, next best action, among others.

An example request and response, e.g., requesting additional data and obtaining the requested additional data, are included below:

```
curl -X POST https://some-idr-endpoint.com/idgraph
    -H 'Content-Type: application/json'
    -d '{"request_type":"bulk",
        "cust_id":["crm1", "crm2", "crm2"]
        "requesting":[adobe_id, tradedesk_id]
        }'
{
    "person_ids": {
        "cust_id": ["crm1", "crm2", "crm3"]
    },
    "crm1":{
        "martech_ids": {
            "adobe_id": ["adobe123", "adobeXYZ"],
            "tradedesk_id":["tradeDesk123"]
        }
    },
    "crm2":{
        "martech_ids": {
            "adobe_id": ["adobe999", "adobe000"],
            "tradedesk_id":["tradeDeskZZZ"]
        }
    },
    "crm3":{
        "martech_ids": {
            "adobe_id": ["adobeFFF", "adobeGGG"],
            "tradedesk_id":["tradeDeskTTT"]
        }
    },
}
```

In some implementations, the one or more edge processing nodes 107 and the central processing node 122 can coordinate create a unified central identity graph. For example, the edge processing node 107 and the central processing node 122 can exchange data representing identifying information of one or more entities. In some implementations, data identifying entities is encrypted before storage and non-encrypted data is discarded. In this way, the system 100 can help ensure data privacy of user data.

FIG. 1 is described in stages from stage A to stage D for ease of explanation. In some implementations, stages occur at different relative times, are omitted, or are combined with other stages not shown. For example, the edge processing node 107 can obtain the information 106 while, or before, requesting and receiving data from the central processing node 122—e.g., where the requesting and receiving data includes a request with data obtained prior to the information 106.

Figure 2:
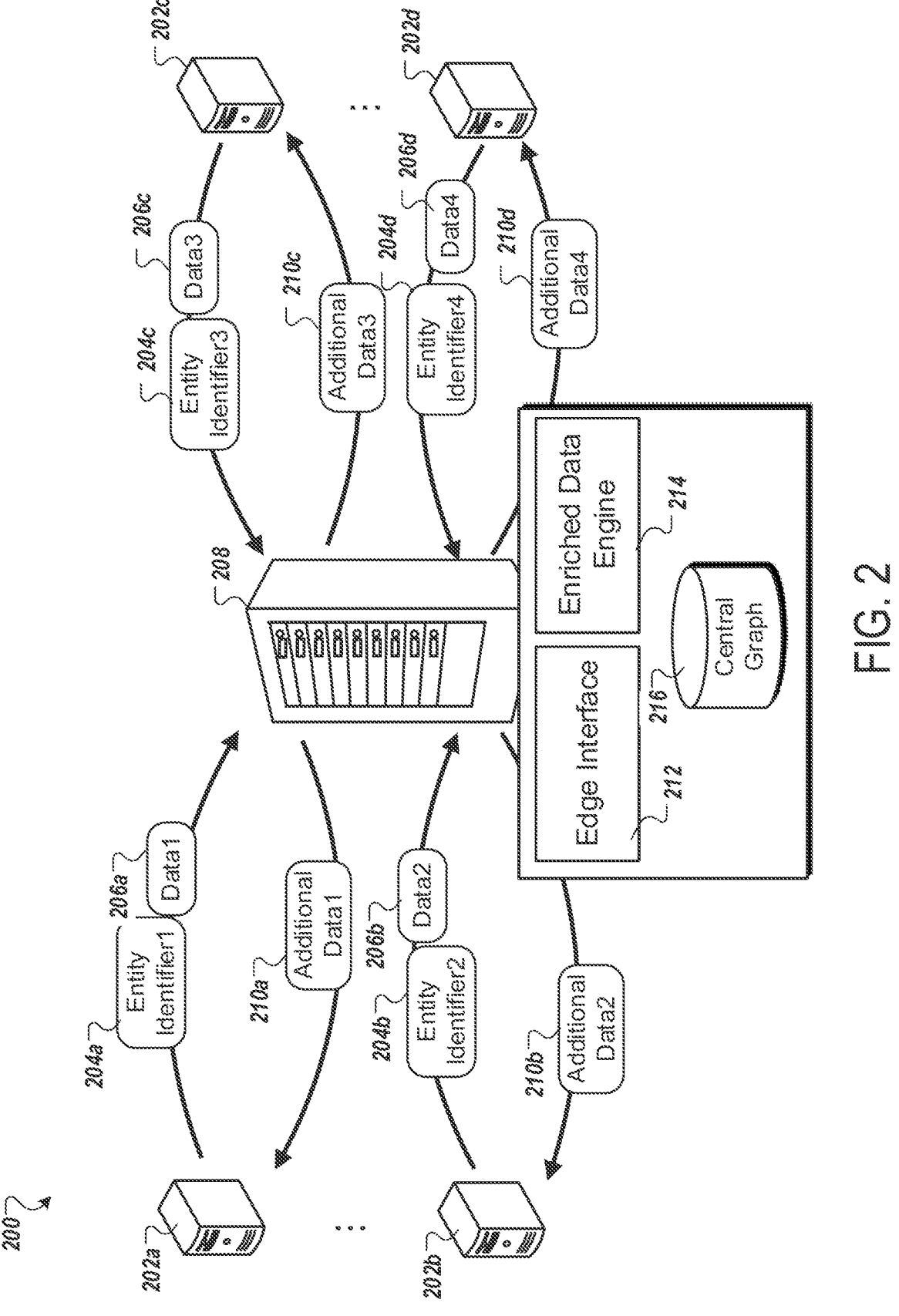
FIG. 2 is a diagram showing an example of a system for exchanging information identifying information using central and edge processing nodes.

FIG. 2 is a diagram showing an example of a system 200 for exchanging information identifying information using central and edge processing nodes. The system 200 includes edge processing nodes 202*a-d* and a central processing node 208. In some implementations, the central processing node 208 performs central processing node operations alone or in cooperation with one or more additional central processing nodes. In some implementations, the system 200 can include more or fewer edge processing nodes.

In some implementations, the system 100 is an example of a type of the system 200. For example, the central processing node 122 of FIG. 1 can be an example of the central processing node 208. The edge processing node 107 of FIG. 1 can be an example of one of the edge processing nodes 202*a-d* of FIG. 2. In some implementations, each of the edge processing nodes in FIG. 2 are communicably connected to one or more IoT devices. The edge processing nodes 202*a-d* can obtain one or more elements of identifying information from those communications, e.g., similar to the edge processing node 107 obtaining the information 106 from the user device 104.

Each edge processing node can engage with the central processing node 208 in a similar way as described with reference to FIG. 1. Each can provide an entity identifier and data corresponding to the identifier (e.g., identifiers 204*a-d* and data 206*a-d*, which can include encrypted versions of legal names and encrypted versions of email addresses, respectively). In some implementations, data provided by an edge processing node includes an encrypted form of identifying information, such as the hashed identifier 120 described in reference to FIG. 1. The hashed identifier 120 can include a subset of information included in the encrypted data 112, an identifier associated with the encrypted data 112 (e.g., determined by the network graph 118) but not included in the encrypted data 112, or a hash value of one or more items of encrypted information.

Each processing node can obtain, in response to providing an entity identifier and data, additional data (e.g., additional data 210*a-d*). The additional data can be an update to existing identity graph stored by the given edge processing node or new data to be added to an existing entity, or a new entity with corresponding identifying information. In some implementations, all data is encrypted both in transmission and during storage. In some implementations, encrypting during transmission is not required because only encrypted forms of data are stored. In some implementations, all elements in a system use the same hashing algorithm to generate tokens such that a hashed string can be compared and be known to correspond to the same entity although the plain text information is not exposed.

The central processing node 208 can use an edge interface to communicably connect to each of the edge processing nodes 202*a-d* and exchange data (e.g., obtain and transmit wired or wireless signals to and from). The central processing node 208 maintains a central graph 216 and operates an enriched data engine 214 configured to provide additional data to requesting edge processors and to update the central graph 216 using updated data obtained from one or more sources, including one or more edge processors.

In some implementations, the central processing node 208 rejects a request for additional data from an edge processing node. For example, the central processing node 208 can identify an edge processing node requesting data (e.g., included as an edge processing node identifier in data from the edge processing node or determined using features of the signal, including embedded data identifying an edge processing node). The central processing node 208 can compare the identify of the edge processing node to one or more identifiers authorized to access information requested by the node. If the central processing node 208 determines the identifier of the node is included in the identifiers, the central processing node 208 can, in response, provide the information. If, instead, the central processing node 208 determines the identifier of the node is not included in the identifiers, the central processing node 208 can, in response, not provide the information or provide information indicating the requesting edge processing node does not have authorization to access requested data.

In some implementations, edge processing nodes are authorized to access data obtained from one or more other edge processing nodes but not from another set of one or more edge processing nodes. For example, enterprises can manage sets of edge processing nodes and agree to share information of detected entities with other enterprises or within an enterprise. If the central processing node 208 determines a first requesting edge node is authorized to access data obtained from a first set of edge processing nodes, the central processing node 208 can provide only that data and not other additional data associated with a given entity (e.g., a person such as John Doe in FIG. 1) that may, nevertheless, be stored on the central processing node 208 and available to other edge processing nodes. In this way, all information of entities may not be available to every node but may only be available to a subset of nodes. Subsets can overlap. In some implementations, each element of data in the central graph 216 of the central processing node 208 includes an identifier of authorization. For example, the identifier of authorization can include numeric or alphanumeric characters. Nodes can be authorized to access only data elements associated with a set of one or more identifiers of authorization.

In some implementations, the central processing node 208 operates the enriched data engine 214 to update the central graph 216. Updating the central graph 216 can include identifying newly obtained identifying information (e.g., including multiple identifiers) that has at least some commonality with existing data in the central graph 216 (e.g., 1 or more identifiers that match stored identifiers). After determining one or more identifiers match previously stored identifiers in the central graph 216, the central processing node 208 can add the other identifiers in the newly obtained identifying information to the central graph 216 connected to the matched identifiers. Identifiers in the central graph 216 can be connected to one or more entity identifiers from which other identifying information for that entity is connected. The entity identifier can be a unique set of characters corresponding to an entity. In some implementations, the entity identifier is a hashed form of a person's name.

In some implementations, one or more of the edge processing nodes 202a-d manages or hosts an interface provided to a user device, such as the user device 104. In some implementations, one or more of the edge processing nodes 202a-d provide digital content or digital content identifiers. For example, the additional data 210c-d can include digital content or digital content identifiers. The additional data 210a-b can include the digital content provided by the edge processing nodes 202c-d for particular entities.

In some implementations, data of digital identities can be exchanged by edge processing nodes within an enterprise or without an enterprise, e.g., intra-enterprise network effect or inter-enterprise network effect.

In some implementations, the central processing node 208 identifies partners for data exchange between two or more of the edge processing nodes. For example, the central processing node 208 can obtain metadata from one or more of the edge processing nodes 202a-d. The metadata can be generated and transmitted by the one or more of the edge processing nodes 202a-d to the central processing node 208. The metadata can identify contents in a graph of one or more of the edge processing nodes 202a-d without exposing confidential information. Metadata can include an indication of identity types (e.g., a classification of one or more individuals included in a graph or types of identifying information available for one or more individuals included in a graph), a number of individuals represented; number of households represented; an indication of a distribution of individuals (e.g., based on demographics like location, gender, age group, among others); rate of addition of new individuals; percentage of individuals added within a time period (e.g., in past 3 months, 6 months, 1 year, among others); percentage of individual records in graph updated in a time period (e.g., past 3 months, 6 months, 1 year, among others).

In some implementations, each node of the edge processing nodes 202a-d maintains a graph of user identities that they can share, or receive, from one or more of the edge processing nodes 202a-d. For example, the edge processing node 202a can provide metadata of data that it maintains (e.g., in an identity graph) to the central processing node 208. The central processing node 208 can obtain the metadata and provide the metadata to one or more of the other edge processing nodes 202b-d. Each of the edge processing nodes 202b-d can choose to partner with the edge processing node 202a based on a determination using the metadata provided by the edge processing node 202a. In some implementations, the central processing node 208 identifies one or more partners using an algorithm that uses metadata as input. For example, partners can indicate an interest in certain types of partners. When the central processing node 208 receives metadata, the central processing node 208 can parse the metadata to determine if the metadata matches types of partners indicated by one or more edge nodes (e.g., an edge node can provide an indication to the central processing node 208 that it will partner with nodes with a threshold number of users or other quantity or value identified in the metadata provided by a given node).

Each edge processing node (e.g., of the edge processing nodes 202a-d) can determine identity types to share with one or more collaborating partners. A determination of data to share can be, e.g., based on a privacy policy or local laws. Each edge processing node can publish metadata about identity types to share, allowing the potential collaborating partners to evaluate a partnership. Each edge node can update metadata on a periodic basis. Metadata can be sent to a central node—such as the central processing node 208—and be made available to potential collaborating partners.

Potential collaborating partners can compare metadata of network partners and determine (i) identity types to share with a network partner and (ii) the potential identity enrichment an edge node partner can obtain for an existing user base. In some implementations, identity types being shared with one or more network collaborating partners are mutual. For example, partner A (e.g., edge node 202c) choses to share device identifiers with partner B (e.g., edge node 202a). Partner B can store and therefore be capable of sharing device identifiers, mobile advertising identifiers, manufacturing identifiers, among others. However, because partner A only shares device identifiers, partner B can be configured to automatically share only device identifiers. As discussed, sharing of data between partners can be controlled using a central node, such as the central processing node 208.

In an example scenario, the edge processing node 202a can represent a first partner sharing data in the system 200. The edge processing node 202a can publish metadata for identity types to be shared. The edge processing node 202a can fetch other network partners' metadata from the central processing node 208. The edge processing node 202a can evaluate and identify potential network partners (e.g. edge processing node 202b, among others). The edge processing node 202a can enter an identity sharing agreement with one or more of the evaluated and identified potential network partners.

In some implementations, additional edge processing nodes maintain identifying information used to generate a unified graph. In some implementations, each of the edge processing nodes store an identity graph that includes identifying information of one or more entities. For example, each of the edge processing nodes 202a-d can store a separate identity graph, which can be unique, or include unique data elements, relative to one another. Edge processing node 202a can store graph G1, edge processing node 202b can store graph G2, edge processing node 202c can store graph G3, and edge processing node 202d can store graph G4. In some implementations, the information of each of G1, G2, G3, and G4 can be combined into the central graph 216, e.g., using the techniques described in this document performed by a central processing node. For example, the edge processing nodes 202a-d can have an agreement to share identity information in their network with the central processing node 208.

The network graph 216 can be represented in the above example as $C_1 = \{G_1 \cup G_2 \cup G_3 \cup G_4\}$, e.g., a union of individual contributing identity graphs. In some implementations, the central processing node 208 provides the network graph 216 data to one or more other central processing nodes. The other central processing nodes can union the provided data with their existing data to update their central graphs.

In some implementations, edge processing nodes are only in agreement with a set of one or more other edge processing nodes. For example, the central processing node 208 can create one or more central graphs in the central graph 216 and share information amongst edge processing nodes depending on what edge processing nodes have agreed to share data with one another. Another central graph can be a union of a subset of participating graphs (e.g., G1 and G2). That is, the edge processing node 202a may be in agreement to share data with node 202b but not with 202c and 202d. The central processing node 208 can obtain data from one or more of the edge processing nodes indicating agreements and generate separate identity graphs for each agreement so that enriched data includes only data from nodes within an agreement group.

In some implementations, the central processing node 208 operates one or more algorithms to ensure that each edge processing node graph is synchronized with the central graph 216 in real or near real time (e.g., within 10 seconds, 10 ms, depending on architecture). This process can help ensure that all participants in the system 200 have access to a complete dataset. A complete dataset can depend on agreements, e.g., a graph stored by the edge processing node 202b is complete if it has agreed to share only with the node 202a and the graph includes all identifying information from both the node 202b and node 202a even though additional data exists in the system 200 from, e.g., the node 202c-d.

In one example scenario, specific data points may be outdated in one edge processing node graph. Such data points can be kept current through data sharing process enabled by the central processing node 208.

To illustrate one example process, consider Bob—a user of an application, or website, managed or hosted by the edge processor 202a—is moving cities. Bob's home address becomes outdated within the local graph stored on the edge processing node 202a. A different edge processing in the system 200—e.g., who manages or hosts services, websites, applications, among others in the city Bob just moved to—can obtain identifying information of Bob that includes a new address. Such data can be obtained when Bob logs into a website, uses an application, makes a purchase, among other actions. Data synchronization can allow participating members of the system 200 to obtain data indicating the new address for Bob and that Bob's old address may belong to someone else.

In some implementations, graphs stored by edge processing nodes reside within an end user network. Edge processing nodes can capture and process first party identifiers (e.g., the information 106 referenced in FIG. 1). Identifying information can be obtained, normalized, and pseudonymized in memory. In some implementations, edge processing nodes, such as the nodes 202a-d, never store identifying information in plain text in non-temporary storage.

In some implementations, identifying information is stored in individual edge processing nodes and provided either directly to other edge processing nodes or to a central processing node, e.g., the central processing node 208. Identifying information can be leveraged directly by edge processing nodes in accordance with the data usage policies set by either the edge processing node, the central processing node, or one or more intermediary nodes that can exist between the two to manage access between elements of the system 200.

In some implementations, an edge processing node provides data to another edge processing node. The second edge processing node can use the data to provide content or other personalization to a user of a website or application hosted or managed by the second edge processing node. In some implementations, the first edge processing node providing the data can include additional data the specifies how the personalization or content is to be provided for any subsequent edge processing node. For example, the first edge processing node providing data can specify that a given entity should be provided content only through particular channels (e.g., through phone but not through email, not more than once a week, among other rules). In some implementations, the rules are chosen by the given entity and provided by the entity through an interface to the first edge processing node.

In some implementations, the system 200 provides capability for enterprises to centrally manage and satisfy the following requests pertaining to consumer privacy rights, including: right to access, right to rectification, right to restrict processing, right of data portability, right to object, among others.

FIG. 3 is a flowchart illustrating an example of a process 300 for enriching identifying information using central and edge processing nodes. The process 300 may be performed by one or more electronic systems, for example, the system 100 of FIG. 1 or the system 200 of FIG. 2.

The process 300 includes obtaining identifying information of a first entity (302). The identifying information can be obtained via an interface operating on a device of a user. For example, the user device 104 can provide identifying information 106 to the edge processing node 107.

The process 300 includes generating a hash value for each of one or more components of the identifying information (304). For example, the hash engine 108 can process the information 106 to generate encrypted data 112 based on processing the information 106.

The process 300 includes deleting the identifying information (306). For example, the memory engine 110 can discard the plaintext version of the information 106, e.g., after the encrypted data 112 is generated from the information 106.

The process 300 includes storing the hash value for each of the one or more components of the identifying information and not the identifying information (308). For example, the memory engine 110 can discard the plaintext version of information 106 before the edge processing node 107 stores the information 106 to non-temporary storage. The information 106 can be stored in cache to perform encryption before being immediately discarded after the encrypted data 112 is generated.

The process 300 includes generating a network graph linking the hash value for each of the one or more components of the identifying information with the first entity (310). For example, the edge processing node 107 can generate the network graph 118 from scratch using the information 106 or update a previously generated network graph 118.

The process 300 includes providing the hash of the identifying information to a central server (312). For example, the edge processing node 107 can send a hashed identifier 120 to the central processing node 122.

The process 300 includes updating, using response data from the central server, the network graph to additionally link to a respective hash value for each component in a second set of components identifying the first entity (314). The edge processing node 107 can combine the additional data 124, obtained from the central processing node 122 in response to providing the hashed identifier 120, with the encrypted data 112 to generate the enriched data 126.

In some implementations, the process 300 includes obtaining a request for identification information of the first entity. For example, a component of the edge processing node 107 or a third party (e.g., a device communicably connected to the edge processing node 107) can generate and send the request to the edge processing node 107. The request can include identifying information of the first entity—e.g., the hash of the identifying information or other hash values identifying the first entity.

In some implementations, the process 300 includes providing, in response to obtaining the request for the identification information of the first entity and using the updated network graph, the identification information of the first entity. For example, the edge processing node 107 can provide to a component of the edge processing node 107 or third party (e.g., a device communicably connected to the edge processing node 107) the identification information of the first entity. The identification information of the first entity can include information of preferences of the first entity, identifiers that can be used to identify preferences of the first entity, identifiers that can be used to identify interests of the first entity, among others.

In some implementations, the process 400 includes selecting, using the identification information of the first entity, a user device digital component; and providing the user device digital component to a device of the first entity. For example, the edge processing node 107 can select a user device digital component (e.g., a digital visual or textual message). The edge processing node 107 can select a user device digital component using identification information of a first entity. For example, the edge processing node 107 can determine an interest of the first entity (e.g., shopping, particular store, topic, among others) and select a user device digital component that indicates the interest. A digital component can include content that is intended to supplement content of a webpage or other resource. More specifically, the digital component may include digital content that is relevant to resource content (e.g., the digital component may relate to a topic that is the same as or otherwise related to a topic or content of a webpage). The provision of digital components can thus supplement, and generally enhance, a web page or application content.

In some implementations, the process 400 includes selecting, using the identification information of the first entity, an adjustment to a device application; and providing the adjustment to a device of the first entity configured to adjust an operation of the device application running on the device of the first entity. For example, the edge processing node 107 can select an adjustment to a device application. The adjustment to the device application can include an adjustment to the operation of the device application—e.g., personalized greeting, layout of features visible within an application, features enabled within the application, default notification settings, contacts for emergency notification, among others. The edge processing node 107 can select an adjustment using identification information of a first entity. For example, the edge processing node 107 can determine a preference of a first entity (e.g., application layout preference from other stored applications, notification preferences, look and feel of application preferences, among others) and select an adjustment that changes operation of an application to more closely match a known preference of the first entity.

The edge processing node 107 can provide the adjustment to a device of the first entity configured to adjust an operation of the device application running on the device of the first entity. For example, the edge processing node 107 can generate a data packet that is configured, after being received by the device of the first entity, to adjust a device application running on the device of the first entity. The data packet can include an identification of one or more adjustments and one or more applications to be adjusted.

FIG. 4 is a flow diagram illustrating an example of a process 400 for enriching identifying information using central and edge processing nodes. The process 400 may be performed by one or more electronic systems, for example, the system 100 of FIG. 1 or the system 200 of FIG. 2.

The process 400 includes obtaining, from a first edge processing node, a first hash value of information identifying a first entity (402) and obtaining, from a second edge processing node, a second hash value of information identifying the first entity (404). For example, each edge processing node, as described in FIG. 2, can engage with the central processing node 208 in a similar way as described with reference to FIG. 1. Each node can provide an entity identifier and data corresponding to the identifier (e.g., identifiers 204*a-d* and data 206*a-d*, which can include encrypted versions of legal names and encrypted versions of email addresses, respectively).

The process 400 includes generating a data packet that includes the first hash value and the second hash value (406). For example, the central processing node 208 can generate a data packet that includes one or more data items provided by one or more of the edge processing nodes 202*a-d*.

The process 400 includes providing, to (i) the first edge processing node and (ii) the second edge processing node, the generated data packet (408). For example, the central processing node 208 can provide the generated data packets that include one or more data items provided by one or more of the edge processing nodes 202*a-d* to one or more of the edge processing nodes 202*a-d.*

Figure 5:
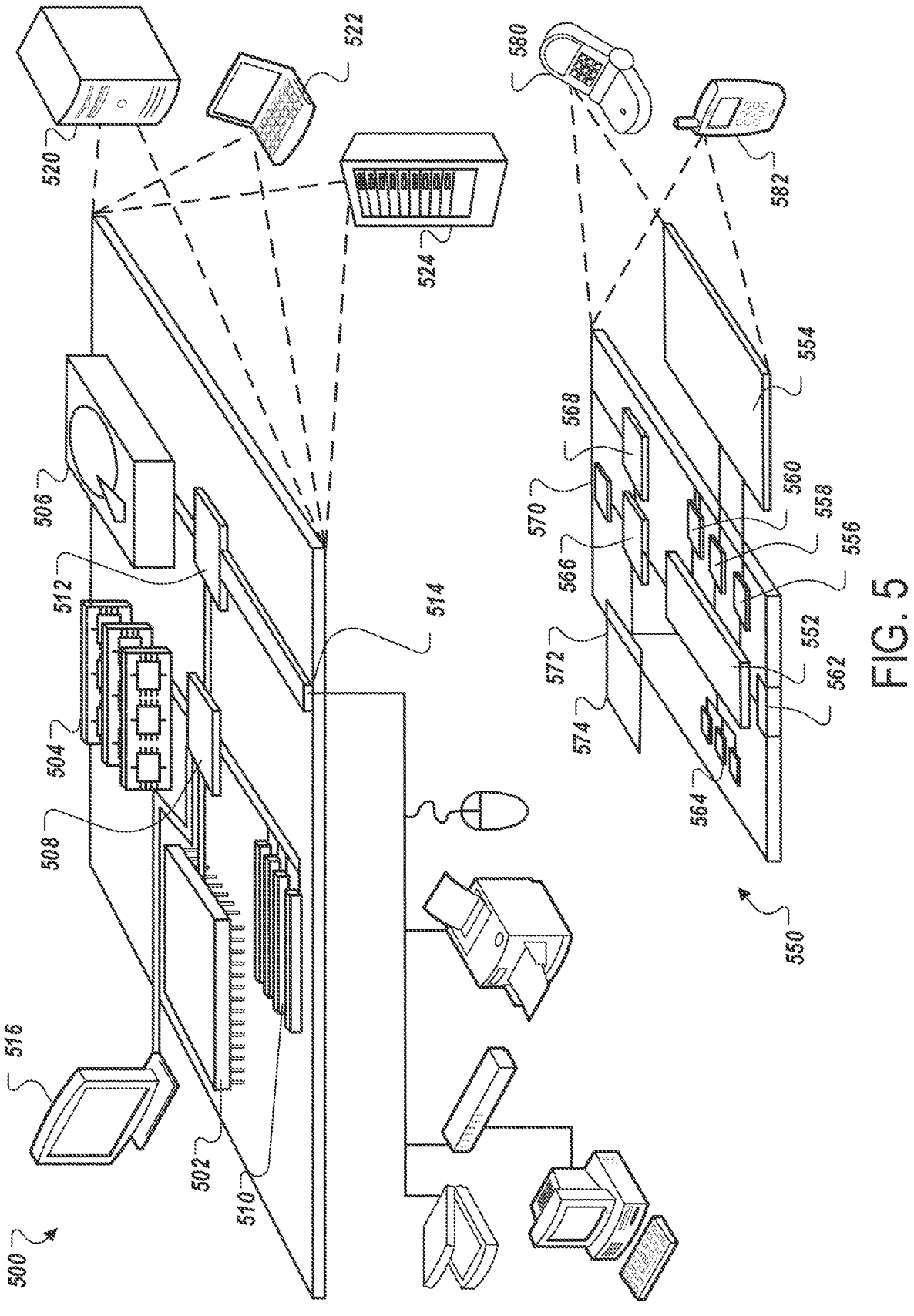
FIG. 5 is a diagram illustrating an example of a computing system used for enriching or exchanging identifying information using central and edge processing nodes.

FIG. 5 is a diagram illustrating an example of a computing system used for processing digital communications using a machine-learning network. The computing system includes computing device 500 and a mobile computing device 550 that can be used to implement the techniques described herein. For example, one or more components of the system 100 could be an example of the computing device 500 or the mobile computing device 550, such as a computer system implementing the edge processing node 107 or central processing node 122 of FIG. 1, devices that access information from the edge processing node 107 or central processing node 122, or a server that accesses or stores information regarding the operations performed by the edge processing node 107 or central processing node 122. Computing systems can include one or more internet connected devices.

The computing device 500 is intended to represent various forms of digital computers, such as laptops, desktops, workstations, personal digital assistants, servers, blade servers, mainframes, and other appropriate computers. The mobile computing device 550 is intended to represent various forms of mobile devices, such as personal digital assistants, cellular telephones, smart-phones, mobile embedded radio systems, radio diagnostic computing devices, and other similar computing devices. The components shown here, their connections and relationships, and their functions, are meant to be examples only, and are not meant to be limiting.

The computing device 500 includes a processor 502, a memory 504, a storage device 506, a high-speed interface 508 connecting to the memory 504 and multiple high-speed expansion ports 510, and a low-speed interface 512 connecting to a low-speed expansion port 514 and the storage device 506. Each of the processor 502, the memory 504, the storage device 506, the high-speed interface 508, the high-speed expansion ports 510, and the low-speed interface 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as a display 516 coupled to the high-speed interface 508. In other implementations, multiple processors and/or multiple buses may be used, as appropriate, along with multiple memories and types of memory. In addition, multiple computing devices may be connected, with each device providing portions of the operations (e.g., as a server bank, a group of blade servers, or a multi-processor system). In some implementations, the processor 502 is a single threaded processor. In some implementations, the processor 502 is a multi-threaded processor. In some implementations, the processor 502 is a quantum computer.

The memory 504 stores information within the computing device 500. In some implementations, the memory 504 is a volatile memory unit or units. In some implementations, the memory 504 is a non-volatile memory unit or units. The memory 504 may also be another form of computer-readable medium, such as a magnetic or optical disk.

The storage device 506 is capable of providing mass storage for the computing device 500. In some implementations, the storage device 506 may be or include a computer-readable medium, such as a floppy disk device, a hard disk device, an optical disk device, or a tape device, a flash memory or other similar solid-state memory device, or an array of devices, including devices in a storage area network or other configurations. Instructions can be stored in an information carrier. The instructions, when executed by one or more processing devices (for example, processor 502), perform one or more methods, such as those described above. The instructions can also be stored by one or more storage devices such as computer- or machine readable mediums (for example, the memory 504, the storage device 506, or memory on the processor 502). The high-speed interface 508 manages bandwidth-intensive operations for the computing device 500, while the low-speed interface 512 manages lower bandwidth-intensive operations. Such allocation of functions is an example only. In some implementations, the high speed interface 508 is coupled to the memory 504, the display 516 (e.g., through a graphics processor or accelerator), and to the high-speed expansion ports 510, which may accept various expansion cards (not shown). In the implementation, the low-speed interface 512 is coupled to the storage device 506 and the low-speed expansion port 514. The low-speed expansion port 514, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. In addition, it may be implemented in a personal computer such as a laptop computer 522. It may also be implemented as part of a rack server system 524. Alternatively, components from the computing device 500 may be combined with other components in a mobile device, such as a mobile computing device 550. Each of such devices may include one or more of the computing device 500 and the mobile computing device 550, and an entire system may be made up of multiple computing devices communicating with each other.

The mobile computing device 550 includes a processor 552, a memory 564, an input/output device such as a display 554, a communication interface 566, and a transceiver 568, among other components. The mobile computing device 550 may also be provided with a storage device, such as a micro-drive or other device, to provide additional storage. Each of the processor 552, the memory 564, the display 554, the communication interface 566, and the transceiver 568, are interconnected using various buses, and several of the components may be mounted on a common motherboard or in other manners as appropriate.

The processor 552 can execute instructions within the mobile computing device 550, including instructions stored in the memory 564. The processor 552 may be implemented as a chipset of chips that include separate and multiple analog and digital processors. The processor 552 may provide, for example, for coordination of the other components of the mobile computing device 550, such as control of user interfaces, applications run by the mobile computing device 550, and wireless communication by the mobile computing device 550.

The processor 552 may communicate with a user through a control interface 558 and a display interface 556 coupled to the display 554. The display 554 may be, for example, a TFT (Thin-Film-Transistor Liquid Crystal Display) display or an OLED (Organic Light Emitting Diode) display, or other appropriate display technology. The display interface 556 may include appropriate circuitry for driving the display 554 to present graphical and other information to a user. The control interface 558 may receive commands from a user and convert them for submission to the processor 552. In addition, an external interface 562 may provide communication with the processor 552, so as to enable near area communication of the mobile computing device 550 with other devices. The external interface 562 may provide, for example, for wired communication in some implementations, or for wireless communication in other implementations, and multiple interfaces may also be used.

The memory 564 stores information within the mobile computing device 550. The memory 564 can be implemented as one or more of a computer-readable medium or media, a volatile memory unit or units, or a non-volatile memory unit or units. An expansion memory 574 may also be provided and connected to the mobile computing device 550 through an expansion interface 572, which may include, for example, a SIMM (Single In Line Memory Module) card interface. The expansion memory 574 may provide extra storage space for the mobile computing device 550, or may also store applications or other information for the mobile computing device 550. Specifically, the expansion memory 574 may include instructions to carry out or supplement the processes described above, and may include secure information also. Thus, for example, the expansion memory 574 may be provide as a security module for the mobile computing device 550, and may be programmed with instructions that permit secure use of the mobile computing device 550. In addition, secure applications may be provided via the SIMM cards, along with additional information, such as placing identifying information on the SIMM card in a non-hackable manner.

The memory may include, for example, flash memory and/or NVRAM memory (nonvolatile random access memory), as discussed below. In some implementations, instructions are stored in an information carrier such that the instructions, when executed by one or more processing devices (for example, processor 552), perform one or more methods, such as those described above. The instructions can also be stored by one or more storage devices, such as one or more computer- or machine-readable mediums (for example, the memory 564, the expansion memory 574, or memory on the processor 552). In some implementations, the instructions can be received in a propagated signal, for example, over the transceiver 568 or the external interface 562.

The mobile computing device 550 may communicate wirelessly through the communication interface 566, which may include digital signal processing circuitry in some cases. The communication interface 566 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), LTE, 5G/6G cellular, among others. Such communication may occur, for example, through the transceiver 568 using a radio frequency. In addition, short-range communication may occur, such as using a Bluetooth, Wi-Fi, or other such transceiver (not shown). In addition, a GPS (Global Positioning System) receiver module 570 may provide additional navigation- and location-related wireless data to the mobile computing device 550, which may be used as appropriate by applications running on the mobile computing device 550.

The mobile computing device 550 may also communicate audibly using an audio codec 560, which may receive spoken information from a user and convert it to usable digital information. The audio codec 560 may likewise generate audible sound for a user, such as through a speaker, e.g., in a handset of the mobile computing device 550. Such sound may include sound from voice telephone calls, may include recorded sound (e.g., voice messages, music files, among others) and may also include sound generated by applications operating on the mobile computing device 550.

The mobile computing device 550 may be implemented in a number of different forms, as shown in the figure. For example, it may be implemented as a cellular telephone 580. It may also be implemented as part of a smart-phone 582, personal digital assistant, or other similar mobile device.

A number of implementations have been described. Nevertheless, it will be understood that various modifications may be made without departing from the spirit and scope of the disclosure. For example, various forms of the flows shown above may be used, with steps re-ordered, added, or removed.

Embodiments of the invention and all of the functional operations described in this specification can be implemented in digital electronic circuitry, or in computer software, firmware, or hardware, including the structures disclosed in this specification and their structural equivalents, or in combinations of one or more of them. Embodiments of the invention can be implemented as one or more computer program products, e.g., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Particular embodiments of the invention have been described. Other embodiments are within the scope of the following claims. For example, the steps recited in the claims can be performed in a different order and still achieve desirable results.

What is claimed is:

1. A method comprising:
obtaining, via an interface, identifying information of a first entity;
generating a hash value for each of one or more components of the identifying information;
deleting the identifying information;
storing the hash value for each of the one or more components of the identifying information and not the identifying information;
generating a network graph linking the hash value for each of the one or more components of the identifying information with the first entity;
providing a hash of the identifying information to a central server;
updating, using response data from the central server, the network graph to additionally link to a respective hash value for each component in a second set of components identifying the first entity;
obtaining a request for identification information of the first entity; and providing, in response to obtaining the request for the identification information of the first entity and using the updated network graph, the identification information of the first entity, wherein obtaining the identifying information of the first entity comprises:

obtaining, from a first edge processing node, a first hash value of information identifying the first entity;

obtaining, from a second edge processing node, a second hash value of information identifying the first entity;

generating a data packet that includes the first hash value and the second hash value; and providing, to (i) the first edge processing node and (ii) the second edge processing node, the generated data packet.

2. The method of claim 1, wherein updating, using the response data from the central server, the network graph to additionally link to a respective hash value for each component in the second set of components identifying the first entity comprises:

obtaining the response data from the central server representing one or more hash values of the second set of components identifying the first entity.

3. The method of claim 1, wherein generating the network graph comprises:

generating a network graph linking the hash value for each of the one or more components of the identifying information with additional hash values representing information identifying the first entity.

4. The method of claim 3, wherein the information identifying the first entity includes a name of a person.

5. The method of claim 3, comprising:

obtaining the additional hash values representing information identifying the first entity from a digital advertising system.

6. The method of claim 1, wherein providing the hash of the identifying information to the central server comprises:

providing at least a portion of the network graph to the central server.

7. The method of claim 1, wherein discarding the identifying information comprises:

discarding a plaintext representation of the identifying information.

8. The method of claim 1, comprising:

storing the identifying information in cache memory; and generating, using the identifying information stored in cache memory, the hash value for each of the one or more components of the identifying information.

9. The method of claim 1, comprising:

selecting, using the identification information of the first entity, a user device digital component; and providing the user device digital component to a device of the first entity.

10. The method of claim 1, comprising:

selecting, using the identification information of the first entity, an adjustment to a device application; and providing the adjustment to a device of the first entity configured to adjust an operation of the device application running on the device of the first entity.

11. The method of claim 1, wherein generating the data packet that includes the first hash value and the second hash value comprises:

storing in temporary storage the first hash value and the second hash value without decrypting the first hash value and the second hash value.

12. The method of claim 1, further comprising:

providing an interface to the first edge processing node and the second edge processing node.

13. The method of claim 12, wherein obtaining, from the first edge processing node, the first hash value of the information identifying the first entity and obtaining, from the second edge processing node, the second hash value of information identifying the first entity comprises:

obtaining, from the interface operating on the first edge processing node, the first hash value of information identifying the first entity; and obtaining, from the interface operating on the second edge processing node, the second hash value of information identifying the first entity.

14. The method of claim 1, wherein obtaining the first hash value of information identifying the first entity from the first edge processing node comprises:

obtaining a hash value of a name of a person, wherein the first entity is a person.

15. The method of claim 1, wherein one or more of the first edge processing node and the second edge processing node are operated by a digital advertising system.

16. A system, comprising:

one or more processors; and machine-readable media interoperably coupled with the one or more processors and storing one or more instructions that, when executed by the one or more processors, perform operations comprising:

obtaining, via an interface, identifying information of a first entity;

generating a hash value for each of one or more components of the identifying information;

deleting the identifying information;

storing the hash value for each of the one or more components of the identifying information and not the identifying information;

generating a network graph linking the hash value for each of the one or more components of the identifying information with the first entity;

providing a hash of the identifying information to a central server;

updating, using response data from the central server, the network graph to additionally link to a respective hash value for each component in a second set of components identifying the first entity;

obtaining a request for identification information of the first entity; and providing, in response to obtaining the request for the identification information of the first entity and using the updated network graph, the identification information of the first entity, wherein obtaining the identifying information of the first entity comprises:

obtaining, from a first edge processing node, a first hash value of information identifying the first entity;

obtaining, from a second edge processing node, a second hash value of information identifying the first entity;

generating a data packet that includes the first hash value and the second hash value; and providing, to (i) the first edge processing node and (ii) the second edge processing node, the generated data packet.

17. The system of claim 16, wherein updating, using the response data from the central server, the network graph to additionally link to a respective hash value for each component in the second set of components identifying the first entity comprises:

obtaining the response data from the central server representing one or more hash values of the second set of components identifying the first entity.

18. The system of claim 16, wherein generating the network graph comprises:

generating a network graph linking the hash value for each of the one or more components of the identifying information with additional hash values representing information identifying the first entity.

19. The system of claim 18, wherein the information identifying the first entity includes a name of a person.

20. A non-volatile computer readable storage medium comprising readable instructions that cause a processor to:

obtain, via an interface, identifying information of a first entity;

generate a hash value for each of one or more components of the identifying information;

delete the identifying information;

store the hash value for each of the one or more components of the identifying information and not the identifying information;

generate a network graph linking the hash value for each of the one or more components of the identifying information with the first entity;

provide a hash of the identifying information to a central server;

update, using response data from the central server, the network graph to additionally link to a respective hash value for each component in a second set of components identifying the first entity;

obtain a request for identification information of the first entity; and provide, in response to obtaining the request for the identification information of the first entity and using the updated network graph, the identification information of the first entity, wherein obtaining the identifying information of the first entity comprises:

obtaining, from a first edge processing node, a first hash value of information identifying the first entity;

obtaining, from a second edge processing node, a second hash value of information identifying the first entity;

generating a data packet that includes the first hash value and the second hash value; and providing, to (i) the first edge processing node and (ii) the second edge processing node, the generated data packet.

* * * * *